United States Patent Office 3,187,532
Patented June 8, 1965

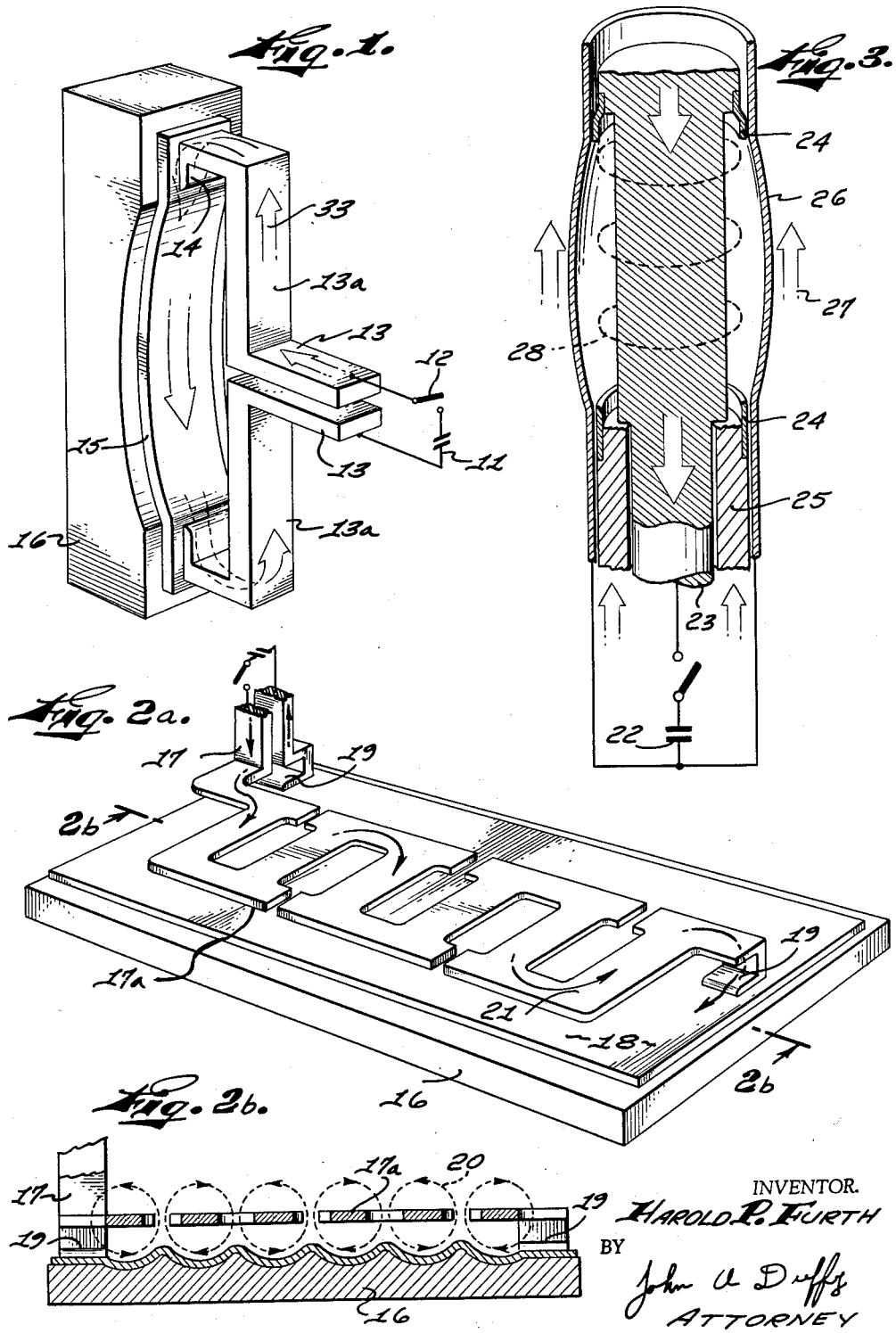

3,187,532
METAL-FORMING DEVICES USING DIRECT
ELECTRODE CONTACT
Harold P. Furth, Berkeley, Calif., assignor to Advanced Kinetics, Inc., Costa Mesa, Calif., a corporation of California
Filed Dec. 26, 1961, Ser. No. 161,923
9 Claims. (Cl. 72—56)

The present invention relates generally to metal-forming by a pulsed magnetic field, and more particularly to forming devices where current is passed directly to the metal surface of the work by means of electrodes, rather than being induced thereon.

A piece of metal can be formed by pressing on it with a pulsed magnetic field. For this purpose a current must flow on the surface of the metal, at right angles to the magnetic field, and the resultant motor force forms the metal against a mold. In magnetic metal forming devices of the known art the pulsed magnetic field induces a current on the metal surface by transformer action. Energy losses such as stray inductive energy storage inherent in transformer operation result therefrom. Additionally high ohmic losses are generated by the two complete current circuits required for the forming process: i.e. the primary circuit through the conductor generating the magnetic field and the secondary circuit through the metal work piece. Accordingly it is an object of this invention to provide a magnetic metal forming device of improved efficiency.

The device of the present invention provides a magnetic metal-forming device in which the surface of the metal work piece is part of the circuit that generates the pulsed magnetic field, contact to the surface being made by specially designed contact electrodes, suitable for passing large current densities. A single complete current circuit is provided for generating the magnetic field and producing the current in the work piece which interacts with the magnetic field to provide magnetic pressure on the work piece. Stray magnetic fields and ohmic losses are maintained at a minimum greatly reducing the energy requirements for the forming operation.

It is therefore another object of this invention to provide a magnetic metal forming device having low energy losses.

It is a further object of this invention to provide a magnetic metal forming device in which the magnetic field and the current in the metal work piece are provided by one complete current circuit.

Other objects and advantages of the present invention will become apparent from the following description and appended claims.

In the drawing:
FIGURE 1 is a schematic perspective view of a particular forming device for forming sheet metal against a mold.
FIGURES 2a and 2b are schematic perspective views of a device for producing corrugations.
FIGURE 3 is a schematic perspective view of a device for expanding tubes.

According to a principal aspect of the invention a conductor is responsively connected to a high energy current source and shaped to provide a magnetic field of predetermined strength. An electrically conductive metal work piece is positioned within said magnetic field at a predetermined distance from the conductor. Means are provided for conductively connecting said conductor to the metal work piece for providing a primary circuit through the conductor and the metal work piece. The current flowing in the conductor generates the magnetic field and the current flowing in the metal work piece interacts with the magnetic field to provide magnetic pressure on the metal work piece.

In the process of magnetic metal-forming a magnetic field of strength B is transiently created outside the surface of the work to be formed. There results a magnetic pressure $$P = B^2/8$$

on the surface. A current orthogonal to the magnetic field, and of density $$I = B/4$$

must flow on the metal surface, per unit length along the magnetic field.

If the magnetic forming device is a closed coil, held near the work, and then pulsed to provide a transient magnetic field, then a current corresponding to that in Equation 2 is transiently induced on the surface of the work. The magnetic forming devices described in the present invention do not constitute closed coils or circuits in themselves, but have electrodes to make contact with the surface of the work and complete the circuit in this way. Then the current described by Equation 2 is passed directly onto the surface of the work by means of the electrodes, instead of being induced.

A technical problem that must be solved in the direct-contact method is how to pass very high current densities onto the surface of the work without damaging the contact electrodes and without doing excessive damage to the surface of the work at the contact points. For magnetic forming, fields of approximately 100,000 gauss strength are needed in order to produce sufficient pressure. For 100,000 gauss strength, Equation 1 gives a pressure of 5600 p.s.i., and Equation 2 requires a current density of 80,000 amperes per unit length along the magnetic field. If the contact from the forming device were made by means of ordinary blunt electrodes, severe sparking and erosion would result at such high current densities.

The present invention makes use of spring contacts, which are so disposed that the current flowing through the contacts presses them against the surface of the work with approximately the same large pressure that is being used for the forming operation itself. This high pressure contact permits the needed high current densities to be passed without excessive damage. The contacts are made of very hard low-sparking materials such as beryllium copper.

Referring now to the drawing, in the forming device shown in FIGURE 1, a capacitor bank 11 having a high energy charge thereon is discharged by means of a switch 12 through the transmission lines 13 and the contact electrodes 14, and along the surface of the work, in this case a piece of sheet metal 15. A single complete current circuit is created flowing along the path illustrated by the arrows 33. A magnetic field appears within this circuit and interacts with the current flowing along the surface of the metal piece 15 to push the sheet metal against a mold 16 by means of magnetic pressure exerted on the work piece 15. The current flowing in the sheet metal 15 is concentrated mostly in the region covered by the portions 13a of the transmission line that are parallel to and located at a predetermined distance from the sheet metal 15, and this is the region where the greatest pressure is exerted. The portions 13a of the transmission line in FIG. 1 are shown as rectangular plates, but more generally they can have any outline, such as a ziz-zag or a semicircle, or they may have constrictions where the current is concentrated and the local magnetic field and pressure are correspondingly increased. The contact electrodes 14 are so disposed that the current flowing from the transmission line 13 to the metal piece 15 acts to improve the contact with the metal piece 15. Each of the electrodes 14 is U shaped with one end being part of the shaped portion 13a to form an inner leg of the U shape and the other end bent to form an outer leg of the U shape. The outer leg of the electrodes is parallel to and touches the metal piece 15 to provide conductive contact between the portions 13a and the metal piece 15. Current flowing in the portions 13a and the outer leg of the electrodes 14 generates a magnetic pressure which acts to push the outer leg of the electrodes 14 against the metal piece 15 to further improve the contact between the portions 13a and the metal piece 15.

The forming device shown in FIGURES 2a and 2b is an example of a generalization of the forming device shown in FIGURE 1. In FIG. 2a the transmission line 17 now has a portion 17a lying parallel to the sheet metal 18, which has a serpentine form. The current is passed to the sheet metal through the contacts 19, and returns on the surface of the sheet metal in a serpentine pattern closely matching that of the transmission line 17a. As a result, a corrugated pattern is formed on the sheet metal 18. The sheet metal 18 may either be driven into a suitably corrugated mold 16, or else a second corrugator (not shown) may be applied on the back side of the sheet metal 18, with the lines of maximum pressure for one corrugator matching the lines of minimum pressure for the other corrugator. The magnetic field pattern set up in the corrugation process is indicated by the arrows 20 in FIG. 2b. The currents flowing in the transmission line system are indicated by the arrows 21.

Referring now to FIG. 3 there is illustrated a magnetic forming device for expanding tubes. In the forming device shown in FIG. 3, a current is passed from a capacitor bank 22 through a coaxial transmission line consisting of an inner cylinder 23 and an outer tube 25, which make contact through the electrodes 24 to the tube 26 that is to be expanded. The path of the current is indicated by the arrows 27, and the resultant azimuthal magnetic field is indicated by the arrows 28. A single current path is provided for generating the magnetic field and the interacting current to provide the magnetic pressure to expand the tube 26.

A particular advantage of the device of the present invention lies in its electrical efficiency. Unlike the induction method of the known art providing strong inductive energy losses and high ohmic losses with the two current circuits the device of this invention reduces losses to a minimum by providing a single current path. Magnetic pressures of higher strength and greater efficiency than heretofore possible are generated.

Various of the novel features of the present invention are set forth in the following claims.

I claim:
1. In a device for forming metal by magnetic pressure;
a high energy current source,
a conductor responsively connected to said current source and shaped to provide a magnetic field of predetermined strength,
an electrically conductive metal work piece positioned within said magnetic field at a predetermined distance from said conductor,
and means for conductively connecting said conductor to said metal work piece for providing a primary circuit through said conductor and said metal work piece, the current flowing in said conductor generating said magnetic field and the current flowing in said metal work piece interacting with said magnetic field to provide magnetic pressure on said metal work piece for shaping the work piece.

2. The metal forming device of claim 1 wherein said means for conductively connecting said conductor to said metal work piece comprises a pair of spring contact electrodes for connecting the ends of said conductor to the ends of said metal work piece.

3. A magnetic metal forming device comprising,
a transmission line responsively connected to a current source and having a portion shaped to provide a magnetic field of high strength,
an electrically conductive metal work piece positioned within said magnetic field at a predetermined distance from said transmission line,
the shaped portion of said transmission line being parallel to said metal work piece, the ends of said shaped portion being bent to form U shaped portions each having an outer leg parallel to and touching said metal work piece to provide conductive contact between said metal work piece and said transmission line, whereby a single current path is created through said transmission line and said metal workpiece for generating said magnetic field and providing magnetic pressure on said metal work piece for shaping the workpiece.

4. The metal forming device recited in claim 3 wherein predetermined parts of the shaped portion of said transmission line are constricted for concentration of current and magnetic field strength.

5. In a magnetic metal forming device having a transmission line and a metal work piece adjacent to and parallel to said transmission line, means for providing a single current path through said transmission line and said metal work piece comprising,
means for conductively connecting said transmission line to said work piece,
and means for applying a high energy current pulse to said transmission line, whereby the current flowing in said transmission line generates a magnetic field of predetermined strength and the current flowing in said metal work piece interacts with the magnetic field to provide magnetic pressure on said metal work piece for shaping the work piece.

6. The magnetic metal forming device recited in claim 5 wherein said means for conductively connecting said transmission line to said work piece comprises a pair of U shaped contact electrodes connecting the ends of said transmission line to the ends of said metal work piece, the outer leg of each said U shaped portion parallel to and touching said metal work piece to provide conductive contact between said metal work piece and said transmission line whereby current flowing in said outer leg interacts with said magnetic field to provide pressure on said outer leg maintaining said outer leg in contact with said metal work piece.

7. A magnetic metal forming device comprising,
a high energy current source,
a first transmission line responsively connected to said current source and shaped in a serpentine form to provide a magnetic field of predetermined strength,
an electrically conductive metal work piece positioned within said magnetic field and adjacent to said transmission line,
means for conductively connecting said transmission line to said metal work piece for providing a current path through said transmission line and said metal work piece, the current flowing in said first transmission line generating said magnetic field and the current flowing in said metal work piece interacting with said magnetic field to provide magnetic pressure on said metal work piece,
mold means adjacent said metal work piece,
said metal work piece positioned between said mold means and said transmission line whereby said magnetic pressure causes said metal work piece to conform to the surface of said mold means.

8. A magnetic metal forming device comprising,
a high energy current source,
an electrically conductive inner tube responsively connected to said current source to provide a magnetic field of predetermined strength,
an electrically conductive outer tube work piece formed in spatial relation about said inner tube and positioned within said magnetic field, and means for conductively connecting said inner tube to said outer tube work piece for providing a current path through said inner tube and said outer tube, the current flowing in said inner tube generating said magnetic field and the current flowing in said outer tube interacting with said magnetic field to provide magnetic pressure on said outer tube, whereby said outer tube is expanded corresponding to the strength of said magnetic field.

9. In a process for forming an electrically conductive metal work piece the steps comprising, placing said metal work piece adjacent a conductor, applying a high energy current pulse to said conductor to generate a magnetic field of high strength, conductively connecting said conductor to said metal work piece by direct contact of said conductor to said metal work piece for providing a current path through said conductor and said metal work piece, the current flowing in said conductor interacting with said magnetic field to provide magnetic pressure on said metal work piece to form said metal work piece.

References Cited by the Examiner

UNITED STATES PATENTS 2,976,907    3/61    Harvey et al. _____ 113—44

WILLIAM J. STEPHENSON, *Primary Examiner.*

CHARLES W. LANHAM, *Examiner.*